(No Model.)
B. H. TEAGUE.
POLISHING STRIP CHUCK.
No. 437,463.    Patented Sept. 30, 1890.
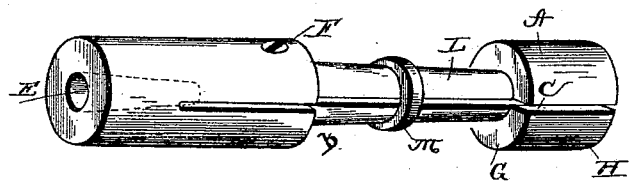
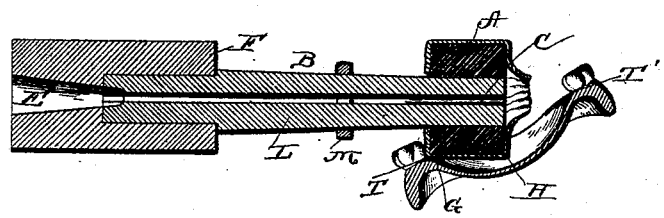
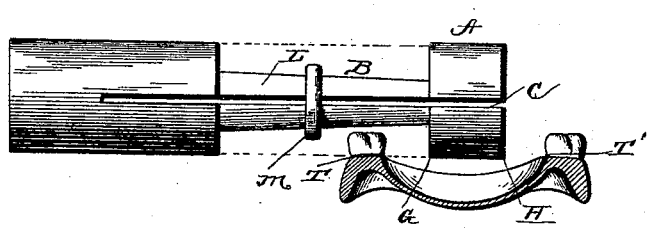
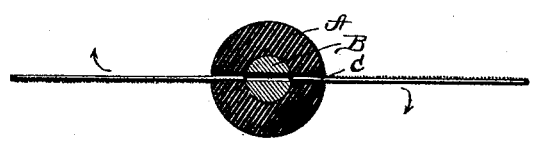
WITNESSES:
INVENTOR
Benjamin H. Teague
BY Whitman + Wilkinson
ATTORNEYS

UNITED STATES PATENT OFFICE.

BENJAMIN HAMMET TEAGUE, OF AIKEN, SOUTH CAROLINA.

POLISHING-STRIP CHUCK.

SPECIFICATION forming part of Letters Patent No. 437,463, dated September 30, 1890.

Application filed June 4, 1890. Serial No. 354,421. (No model.)

*To all whom it may concern:*

Be it known that I, BENJAMIN HAMMET TEAGUE, a citizen of the United States, residing at Aiken, in the county of Aiken and State of South Carolina, have invented certain new and useful Improvements in Polishing-Strip Chucks; and I do hereby declare the following to be a full, clear, and exact description of the invention, such as will enable others skilled in the art to which it appertains to make and use the same.

My invention relates to chucks for polishing irregular surfaces of vulcanite or other hard material, and is specially adapted for use in polishing the plates in artificial sets of teeth; and it consists of a wooden chuck fitted to slip over a revolving spindle and slotted to receive the sand-paper or other abrading material. It has a rubber cylindrical head or cushion on which the sand-paper is wrapped, the ends being tucked in the slot and held by the conical ring pressing together the sides of the slot. On the head of my chuck I use a piece of hard elastic rubber pipe or tubing, slotted like the chuck, giving a yielding surface in polishing, thereby causing it to cover a wider area and to polish more uniformly. This rubber is cut off at right angles to the elements of its cylindrical surface, leaving rectangular shoulders, over which the sand-paper or other abrading material is bent, thus rendering it possible to polish in rectangular corners.

An essential feature of my chuck is the distance between the raised rubber head and the shoulder of the wooden chuck, whereby I am able to use both rectangular polishing-edges of the head of my chuck, and am able to reach parts of the teeth or other articles to be polished which cannot be reached by any other chuck now in use.

In the drawings, where similar parts are indicated by similar letters, Figure 1 represents a perspective view of my chuck before the sand-paper has been put on. Fig. 2 represents my chuck polishing at the necks of an artificial tooth. Fig. 3 shows the capability of using a chuck in angular places. Fig. 4 represents a cross-section through the head of my chuck at right angles to the axis of the spindle, and shows the method of securing the sand-paper.

To describe more fully my invention, A, Fig. 1, represents the rubber pipe or tubing, slotted at C like the chuck B.

C represents the slot adapted for receiving the ends of the sand-paper. The sides of the slot are firmly pressed together by the sliding metal ring M on tapering shank L.

E represents the conical hole into which the spindle fits.

Fig. 2 represents my chuck with the head covered with sand-paper and in use polishing teeth. It will be seen that the shoulders G and H are adapted to polish in the angles T and T' of the teeth. In putting the sand-paper on the head of the chuck, I generally, for simplicity and ease of working, put a piece of sand-paper in each side of the slot, so that as the chuck revolves each piece of paper folding automatically around the rubber forms a continuous surface without the trouble of folding beforehand and tucking each edge into the slot as with a single piece, and does away with the necessity of a rubber band or other holding appliance.

Fig. 3 shows that my chuck can polish rectangularly in the corners T and T', which could not be reached by the ordinary form of the chuck as represented by the dotted lines.

Fig. 4 shows a cross-section at right angles to the axis of the head, where A represents the rubber tube or pipe, and B represents the wooden chuck, and C the slot.

It will be readily seen that my chuck may be made large or small as required.

What I claim, and desire to secure by Letters Patent, is—

1. In a polishing-strip chuck, the combination of an elastic cylindrical cushion A, slotted spindle, and sliding metal ring M, around tapering shank L, pressing the two sides of the slot together, substantially as described.

2. In a polishing-strip chuck, the combination of the elastic cylindrical cushion A, having two rectangular edges G and H, with the slotted spindle, tapering shank L, and ring M, as and for the purposes described.

3. In a polishing-strip chuck, the combination of the rubber cylindrical cushion A, secured to the head of the chuck and having rectangular edges G and H, with the slotted spindle, the recess between cushion and shoulder, tapering shank L, and sliding ring M thereon, as herein set forth.

4. In a polishing-strip chuck, the combination of the rubber cylindrical cushion A, secured to the head of the chuck and having rectangular edges G and H, the tapering shank L, and sliding ring M, the slotted spindle, and two pieces of abrading-paper, as and for the purposes described.

In testimony whereof I affix my signature in presence of two witnesses.

BENJAMIN HAMMET TEAGUE.

Witnesses:
R. A. CHAFEE,
F. B. HENDERSON,